US007897116B2

(12) United States Patent
Zhu et al.

(10) Patent No.: US 7,897,116 B2
(45) Date of Patent: Mar. 1, 2011

(54) COMPOSITE INTERNALS FOR A CIRCULATING FLUIDIZED BED REACTOR

(75) Inventors: Tingyu Zhu, Beijing (CN); Jingdong He, Beijing (CN); Pengfei Jing, Beijing (CN)

(73) Assignee: Institute of Processing Engineering, Chinese Academy of Science, Beijing (CN)

(*) Notice: Subject to any disclaimer, the term of this patent is extended or adjusted under 35 U.S.C. 154(b) by 489 days.

(21) Appl. No.: 12/150,346

(22) Filed: Apr. 25, 2008

(65) Prior Publication Data

US 2008/0267836 A1 Oct. 30, 2008

(30) Foreign Application Priority Data

Apr. 25, 2007 (CN) .......................... 2007 1 0098734

(51) Int. Cl.

| | |
|---|---|
| ***F27B 15/00*** | (2006.01) |
| *F27B 15/14* | (2006.01) |
| *F27B 15/16* | (2006.01) |
| *B01J 10/00* | (2006.01) |
| *B01J 19/00* | (2006.01) |

(52) U.S. Cl. ......... 422/139; 422/198; 422/240; 422/129; 422/146

(58) Field of Classification Search .................. 422/146, 422/139, 198, 240, 129, 211
See application file for complete search history.

(56) References Cited

U.S. PATENT DOCUMENTS

| | | | | |
|---|---|---|---|---|
| 3,885,917 | A * | 5/1975 | Osenkina et al. | 422/145 |
| 4,193,966 | A * | 3/1980 | Dowgul | 422/122 |
| 7,569,086 | B2 * | 8/2009 | Chandran | 48/197 R |
| 2004/0093759 | A1 * | 5/2004 | Witt et al. | 34/321 |

* cited by examiner

*Primary Examiner* — Walter D Griffin
*Assistant Examiner* — Natasha Young
(74) *Attorney, Agent, or Firm* — Nelson Mullins Riley & Scarborough LLP; Kevin J. Canning

(57) ABSTRACT

The present invention relates to a composite internal in a circulating fluidized bed reactor, comprising guide plates, disturbing plates and 2 to 30 round tubes, wherein the guide plate (3) is secured with its one side to the round tube (1), and the disturbing plate (4) is secured with its one side to the round tube (1) and with its another side to another side of said guide plate (3), with an angle of 50 to 90° included between the guide plate (3) and disturbing plate (4). The round tubes (1) each provided with respective guide plate and disturbing plate are fixed together at one end, and said 2 to 30 round tubes (1) are arranged in one and the same plane. The other end of each round tube (1) is arranged in a radiate manner with respect to the fixed point as a center, and an angle included between each round tube (1) is different from or equal to each other, in a range of 100 to 180°. With said composite internal, replacement of particle groups and exchange between gas phase and solid phase flowing fast in a center area will be effectively improved, thereby improving the effect of gas-solid mass transfer and the work efficiency of the circulating fluidized bed, because the effective disturbance on upward and downward particle groups and the gas flow field are adjusted.

9 Claims, 1 Drawing Sheet

$\alpha_2$
$\alpha_1$
1
2

COMPOSITE INTERNALS FOR A CIRCULATING FLUIDIZED BED REACTOR

FIELD OF THE INVENTION

The present invention relates to composite internals in a circulating fluidized bed reactor, and in particular, composite internals for improving fluidization quality and reaction efficiency in a circulating fluidized bed reactor.

BACKGROUND

Circulating fluidized beds are widely used in petroleum, chemical industry, metallurgy, energy, environmental protection and other industrial fields. In circulating fluidized beds of prior art, due to a high concentration of particles, less gas-solid back-mixing and easy to build up temperature and concentration gradients, not only a gas-solid contact efficiency is improved, but advantages such as easy to scale up, able to process viscous materials, higher efficiency of raw materials or equipments, less power consumption, lower investment and cost are obtained. Therefore, an effective means for improving fluidization quality and gas/solid flow performance in circulating fluidized beds of prior art is to add internal components or internals therein. The Internals used at present in fluidized beds include baffle screens, baffle plates, vertical tube bundles, etc. The internals are known in various embodiments, e.g. in a form of a ring, blunt body, round-bar structured packing, slanting flap, corrugated structure, perforated plate, remiform or ridge.

Vertical tube bundles functioning as heat exchange tubes are often used as said internals in fluidized bed reactors in foreign countries, and equivalent diameter is recommended as the scale-up index. In a domestic market, a horizontal louver baffle plate is used in combination with a heat exchange tube bundle. The above-mentioned members have different characteristics, i.e. the horizontal baffle plate has a function of breaking air bubbles, whereas the vertical tube bundle has less scale-up effect. One common defect for said two members is that they would be operated only when an empty bed velocity is lower, resulting in a gas layer containing a small amount of particles present below the horizontal baffle plate, and thus "slugging" among the vertical tubes bundles, when the gas velocity exceeds a certain value (Jin Yong, etc., "A new internal used in a fluidized bed reactor" in the Chinese patent for invention CN 85100040A). Perforated-plate internals, remiform internals and perforated-remiform internals may enhance the gas-solid mixing and contact, and thus the efficiency of a chemical reactor can be enhanced. However, due to a higher flow velocity of the gas and solid in a circulating fluidized bed and the lack of guidance of the gas flow in a fluidized bed by said internals, it is possible to increase the abrasion of said internals and the bed pressure drop in the fluidized bed, with the actual work efficiency of the fluidized bed being affected.

SUMMARY OF THE INVENTION

An object of the present invention is to provide a composite internal specially for a circulating fluidized bed, which comprises tube bundles provided with guide plates and disturbing plates, so that the work efficiency of the fluidized bed is enhanced, wherein said composite internal functions to change a particle concentration distribution in the circulating fluidized bed and lead a gas flow field in said fluidized bed via internals so as to achieve the objects of improving the fluidization quality and enhancing the reaction efficiency within the fluidized bed.

The object of the present invention is achieved with following technical solutions.

The composite internal in a circulating fluidized bed reactor according to this invention includes guide plates 3 and disturbing plates 4, characterized in that said internal further includes 2 to 30 round tubes 1 having substantially the same diameter and length, wherein the guide plate 3 is secured with one side to the round tube 1, and the disturbing plate 4 is secured with one side to the round tube 1 and with another side to another side of the guide plate 3, with an angle of 50 to 90° included between the guide plate 3 and disturbing plate 4. Each of the round tubes 1 provided with said guide plate and disturbing plate is connected at its one end to each other via a securing device 2, and said 2 to 30 round tubes 1 are arranged in one and the same plane. The other end of each round tube 1 is arranged in a radiate manner with respect to a middle point of the securing device as the center, with an angle of 10° to 180° included between each round tube 1.

In the above technical solution, said round tubes 1 are divided into two groups, wherein each group of tubes are fixed via the securing device 2 in a fan shape, with a uniform angle, particularly of 5° to 90°, included between the round tubes in each group, and an angle of 60° to 150° included between said two groups of round tubes.

In any of the above technical solutions, the round tube has a diameter of 0.02 to 0.8 meter, and a length equal to an inner radius of the circulating fluidized bed reactor.

In any of the above technical solutions, the round tube is made of stainless steel, glass reinforced plastics, ceramics or carbon steel.

In any of the above technical solutions, the guide plate has a length equal to 30% to 100% of a length of the round tube, and a width of 0.2 to 200 times a diameter of the round tube.

In any of the above technical solutions, the disturbing plate has a length equal to a length of the guide plate, and a width of 0.2 to 200 times a diameter of the round tube.

In any of the above technical solutions, the disturbing plate may be a planar plate or an arc-shaped plate.

In any of the above technical solutions, the guide plate may be a planar plate or an arc-shaped plate.

In any of the above technical solutions, the guide plate is made of stainless steel, glass reinforced plastics, ceramics or carbon steel.

In any of the above technical solutions, the disturbing plate is made of stainless steel, glass reinforced plastics, ceramics or carbon steel.

In any of the above technical solutions, the securing device includes a shaft or disc.

The composite internal in a circulating fluidized bed reactor according to this invention is installed on an outlet of a riser in said circulating fluidized bed, when in use.

The composite internal in a circulating fluidized bed reactor according to this invention has following advantages in comparison with prior art:

1. The composite internal according to this invention is different from perforated plate, remiform or perforated remiform internals of prior art, in that gas layers and slugging present at a high gas velocity in a circulating fluidized bed due to said perforated plate, remiform or perforated remiform internals would be avoided by means of the radiate arrangement of said composite internal of tube-bundle type and the installation of the disturbing plate.

2. It is primarily intended to, when traditional internals are provided, change a local concentration in a circulating fluidized bed only by disturbing the particle motion, so that limited influence would be exerted on the efficiency of a circulating fluidized bed. With the composite internal according to this invention, replacement of particle groups and exchange between the gas phase and solid phase both flowing fast in a center area would be effectively improved, thereby enhancing the effect of gas-solid mass transfer and the work efficiency of a circulating fluidized bed, because the effective disturbance on upward and downward particle groups is adjusted by the disturbing plate and the gas flowing field is adjusted by the guide plate in said circulating fluidized bed.

3. Installing the traditional internals often results in a significant increase in the amplitude and frequency of an irregular fluctuation in pressure drop in a circulating fluidized bed, due to the fact that the distribution and mass transfer of particle groups inside the bed are taken into account exclusively, instead of effective guiding the gas flow field. So, the equipment reliability is decreased. In the composite internal according to this invention, the design of the guide plate is improved simultaneously with the consideration of mass transfer of particle groups enhanced by upward and downward disturbance, so as to lead effectively the gas flow field by said guide plate and thus reduce significantly the amplitude and frequency of the irregular fluctuation in pressure drop in the fluidized bed, thereby increasing the equipment reliability.

4. Because the traditional internals are primarily of single configuration and single function, their positive effects on the operation flexibility of a desulphurization unit in a circulating fluidized bed is less. The composite internal according to this invention enhances the operation flexibility of the fluidized bed desulphurization unit from conventionally 50%~110% to 30%-150%, with considering both the effective flow distribution of particles and the effective disturbance distribution of gas flow.

DESCRIPTION OF REFERENCE NUMERALS

1—round tube; 2—securing device (for fixing the tubes); 3—guide plate; 4—disturbing plate; 5—circulating fluidized bed reactor; 6—outlet of the circulating fluidized bed reactor; 7—angle included between two groups of round tubes; 8—angle included between the round tubes of each group;

BEST MODES TO CARRY OUT THE INVENTION

The present invention will be explained further in detail with reference to the embodiments and drawings.

Embodiment 1

Figure 2:
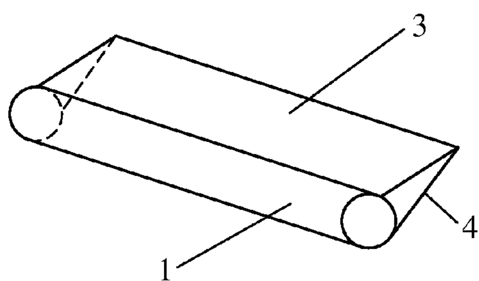
FIG. 2 is a schematic view showing a structure of a round tube provided with a guide plate and disturbing plate according to the present invention.
Figure 4:
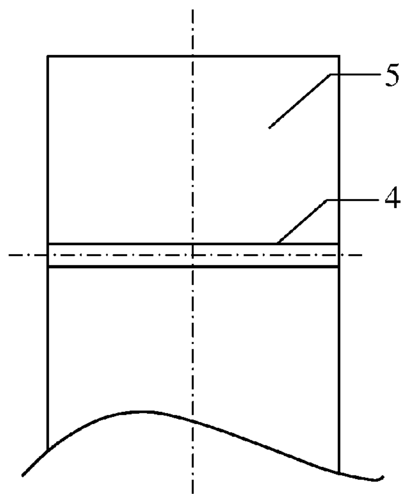
FIG. 4 is a vertical sectional view of the composite member arranged in a circulating fluidized bed according to this invention.

Referring to FIG. 2 and FIG. 4, a composite internal in this embodiment is used in a circulating fluidized bed reactor for flue desulphurization. The composite internal of tube-bundle type comprises six round tubes 1, six guide plates 3 and six disturbing plates 4, wherein each of the round tubes is made of carbon steel, and has a diameter of 0.2 meter and a length of 3 meter. The guide plate 3 is made of carbon steel and has a width of 0.4 meter and a length of 3 meter. The guide plate 3 is welded, with its one side, to an upper part of the round tube 1, and each of the guide plate 3 and the disturbing plate 4 is mounted on the round tube 1 at an angle of 30° (an included angle between the round tubes depends on the quantity of the round tubes, an angle of 75° is included between a connecting line and the horizontal plane, which connecting line connects a welding point at which the guide plate 3 is welded to the round tube 1 and a center of the round tube, and an angle of 45° is included between the guide plate 3 and the horizontal plane). The disturbing plate 4 is made of carbon steel, and has a width of 0.4 meter and a length of 3 meter. Furthermore, the disturbing plate 4 is welded with its one side to one side of the guide plate 4, and with its another side to the round tube 1.

Said six round tubes 1 each provided with respective guide plate 3 and disturbing plate 4 are welded together at respective one end, by means of a disc as a securing device 2. In this case, the six round tubes 1 are arranged in one and the same plane, and an angle of 60° is included between adjacent two of said six round tubes 1, with the other end of each round tube 1 being arranged in a radiate manner. The other end is welded to an inner wall at an outlet on the top of the fluidized bed, when in use.

Embodiment 2

Referring to FIG. 2 and FIG. 4, a composite internal according to this embodiment includes 18 round tubes 1, 18 guide plates 3 and 18 disturbing plates 4. In this case, each of the round tubes 1 is made of ceramics, and has a diameter of 0.08 meter and a length of 3 meter. Both the guide plates 3 and the disturbing plates 4 are carbon steel plates or ceramics plates or glass reinforced plastics plates, and have a width of 0.6 meter and a length of 2 meter. The guide plate 3 is formed into an arc shape with a curvature angle of 15°, and the disturbing plate 4 is formed into an arc shape with a curvature angle of 20°. Said eighteen round tubes 1 each provided with respective guide plate 3 and disturbing plate 4 are welded together at respective one end via a shaft functioning as the securing device 2, with said 18 round tubes 1 being arranged in one and the same plane. An angle of 20° is included between adjacent two of said eighteen round tubes 1, and the respective other ends of said 18 round tubes are arranged in a radiate way.

Embodiment 3

Referring to FIG. 2 and FIG. 4, a composite internal according to this embodiment includes 30 round tubes, 30 guide plates 3 and 30 disturbing plates 4. In this case, each of the round tubes 1 is made of glass fiber reinforced plastics, and has a diameter of 0.2 meter and a length of 4 meter. Both the guide plate 3 and the disturbing plate 4 are arc-shaped plates made of glass fiber reinforced plastic materials (not shown), and have a width of 0.1 meter and a length of 4 meter. Said 30 round tubes 1 each provided with respective guide plate 3 and disturbing plate 4 are welded together at respective one end via a shaft functioning as the securing device 2, with said 30 round tubes arranged in one and the same plane. An angle of 12° is included between adjacent two of said 30 round tubes 1, and the respective other ends of said 30 round tubes 1 are arranged in a radiate way.

Embodiment 4

Figure 1:
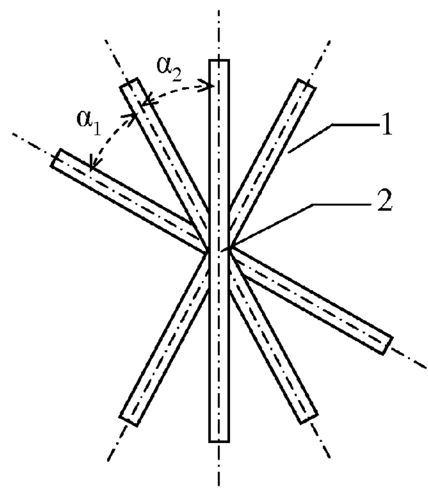
FIG. 1 is a schematic view showing a structure of a composite internal according to the present invention.
Figure 3:
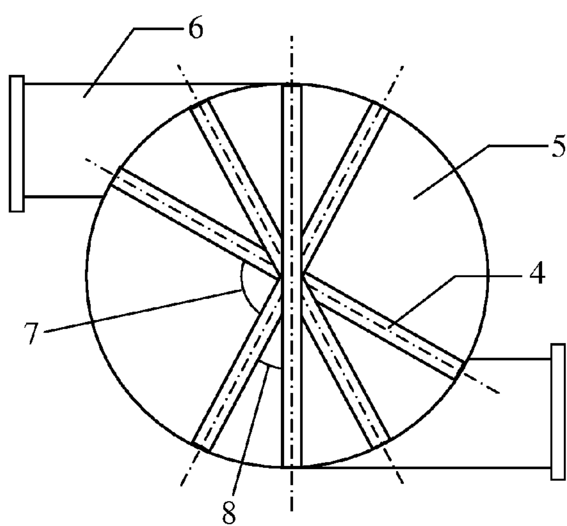
FIG. 3 is a top view of the composite member according to this invention arranged in a circulating fluidized bed.

Referring to FIG. 1, FIG. 2 and FIG. 3, a composite internal in this embodiment includes eight round tubes 1, eight guide plates 3 and eight disturbing plates 4. Each of the round tubes 1 is made of carbon steel, and has a diameter of 0.2 meter and a length of 3 meter. The guide plate 3 is formed into an arc shape from carbon steel, and has a width of 0.4 meter and a length of 3 meter. With its one side, the guide plate 3 is welded to the upper part of the round tube 1. Said eight round tubes 1 are divided into two groups, the round tubes in each group being fixed together in a fan shape by a securing device 2. In this case, a uniform angle is included between adjacent two of said 4 round tubes in each group, which angle is equal to 20°. An angle of 120° is included between said two groups of round tubes. Otherwise, this embodiment is identical with Embodiment 1.

What is claimed is:

1. A composite internal in a circulating fluidized bed reactor, comprising guide plates (3) and disturbing plates (4), characterized in that the composite internal further comprises 2 to 30 round tubes (1), wherein the guide plate (3) is secured with its one side to the round tube (1), and the disturbing plate (4) is secured with its one side to the round tube (1) and with its another side to another side of said guide plate (3), and wherein an angle of 5° to 90° is included between the guide plate (3) and the disturbing plate (4), and each of said round tubes (1) provided with said guide plate and disturbing plate is fixed to each other at one end via a securing device (2), with said 2 to 30 round tubes (1) arranged in one and the same plane, and wherein the other end of each round tube (1) is arranged in a radiate manner with respect to the fixed point as a center, with an angle of 10° to 180° included between each round tube (1).

2. The composite internal in a circulating fluidized bed reactor according to claim 1, characterized in that the round tubes (1) are divided into two groups, each group of round tubes being arranged in a fan shape and fixed together via said securing device (2), with a uniform angle of 5° to 90° included between the round tubes (1) in each group, and an angle of 60° to 150° included between said two groups of round tubes.

3. The composite internal in a circulating fluidized bed reactor according to claim 1, characterized in that the round tube (1) has a diameter of 0.02 to 0.8 meter, and a length equal to a radius of the circulating fluidized bed reactor.

4. The composite internal in a circulating fluidized bed reactor according to claim 1, characterized in that the round tube (1) is made of stainless steel, glass reinforced plastics, ceramics or carbon steel.

5. The composite internal in a circulating fluidized bed reactor according to claim 1, characterized in that the guide plate (3) has a length equal to 30% to 100% of a length of the round tube, and a width equal to 0.5 to 200 times a diameter of the round tube.

6. The composite internal in a circulating fluidized bed reactor according to claim 1, characterized in that the disturbing plate (4) has a length equal to a length of the guide plate (3), and a width equal to 0.2 to 200 times a diameter of the round tube.

7. The composite internal in a circulating fluidized bed reactor according to claim 1, characterized in that the guide plate (3) is a planar plate or an arc-shaped plate made of stainless steel, glass reinforced plastics, ceramics or carbon steel.

8. The composite internal in a circulating fluidized bed reactor according to claim 1, characterized in that the disturbing plate (4) is a planar plate or an arc-shaped plate made of stainless steel, glass reinforced plastics, ceramics or carbon steel.

9. The composite internal in a circulating fluidized bed reactor according to claim 1, characterized in that the securing device (2) includes a shaft or disc.

* * * * *